United States Patent

Decker

[15] 3,668,592

[45] June 6, 1972

[54] CONTROL DEVICE AND METHOD FOR CALIBRATING THE SAME OR THE LIKE

[72] Inventor: Cloyd E. Decker, Indiana, Pa.

[73] Assignee: Robertshaw-Controls Company, Richmond, Va.

[22] Filed: Feb. 18, 1970

[21] Appl. No.: 12,222

[52] U.S. Cl. .......................................... 337/319, 337/323
[51] Int. Cl. ........................... H01h 37/20, H01h 37/36
[58] Field of Search .............. 337/319, 323, 330, 394, 317, 337/321, 326

[56] References Cited

UNITED STATES PATENTS

| | | | |
|---|---|---|---|
| 2,671,838 | 3/1954 | Senn | 337/317 |
| 2,719,202 | 9/1955 | Wolff | 337/326 X |
| 3,214,538 | 10/1965 | Tyler | 337/321 X |
| 3,409,758 | 11/1968 | Hild et al. | 337/323 UX |

Primary Examiner—Bernard A. Gilheany
Assistant Examiner—Dewitt M. Morgan
Attorney—Auzville Jackson, Jr., Robert L. Marben and Candor, Candor & Tassone

[57] ABSTRACT

Calibrating the control shaft means and a set screw of the control shaft means so that upon a loss of fluid in an adjustable expansible and contractible power element of the control device that operates an electrical switch thereof, a subsequent movement of the set screw in a switch closing direction will be limited by stop means before that set screw can cause closing of the switch whereby a fail-safe control device is provided.

7 Claims, 4 Drawing Figures

INVENTOR.
CLOYD E. DECKER

INVENTOR.
CLOYD E. DECKER

CONTROL DEVICE AND METHOD FOR CALIBRATING THE SAME OR THE LIKE

This invention relates to a method for calibrating a control device as well as to the control device or the like.

It was found that in the control device of the patent to Hild et al., U.S. Pat. No. 3,409,758, wherein the control device comprises a frame means carrying an adjustable expansible and contractible power element being utilized to operate an electrical switch that controls a heating means of a domestic oven or the like, that while a loss of fluid in the power element will cause the switch to move to the open position thereof to terminate the operation of the heating means, the adjusting screw being carried by the control shaft means could be driven in a direction to move the collapsed power element so that the same would close the electrical switch and thereby override the fail safe feature of such control device.

Accordingly, it is a feature of this invention to provide a calibration arrangement for such a control device that upon a loss of fluid in the power element thereof, the set screw cannot be driven a distance sufficient to cause closing of the switch construction which moves to its open position upon the loss of fluid in the power element.

In particular, one embodiment of this invention provides a method for calibrating such a control device by bottoming out the set screw of the control shaft means and holding the control shaft means at a high temperature position that corresponds to the temperature of a first bath while disposing the temperature sensor of the power element in the first bath so that the movable wall of the power element will move to a first position thereof. At this time, the control device is calibrated to an off position of the electrical switch by rotating a hub of the device that threadedly receives the control shaft therein to such a calibrated position. Thereafter, the hub is fixed from rotation in the device in such calibrated position thereof. The control shaft means is then moved to a lower temperature position thereof that corresponds to the temperature of a second bath and while disposing the sensor in the second bath so that the power element will be moved to a second position thereof, the device is calibrated to an off position by backing out the set screw from its bottomed out position in the control shaft means.

Accordingly, it is an object of this invention to provide an improved method for calibrating a temperature responsive control device or the like, the method of this invention having one or more of the novel features set forth above or hereinafter shown or described.

Another object of this invention is to provide an improved control device, the control device of this invention having one or more of the novel features set forth above or hereinafter shown or described.

Other objects, uses and advantages of this invention are apparent from a reading of this description which proceeds with reference to the accompanying drawings forming a part thereof and wherein.

Figure 1:
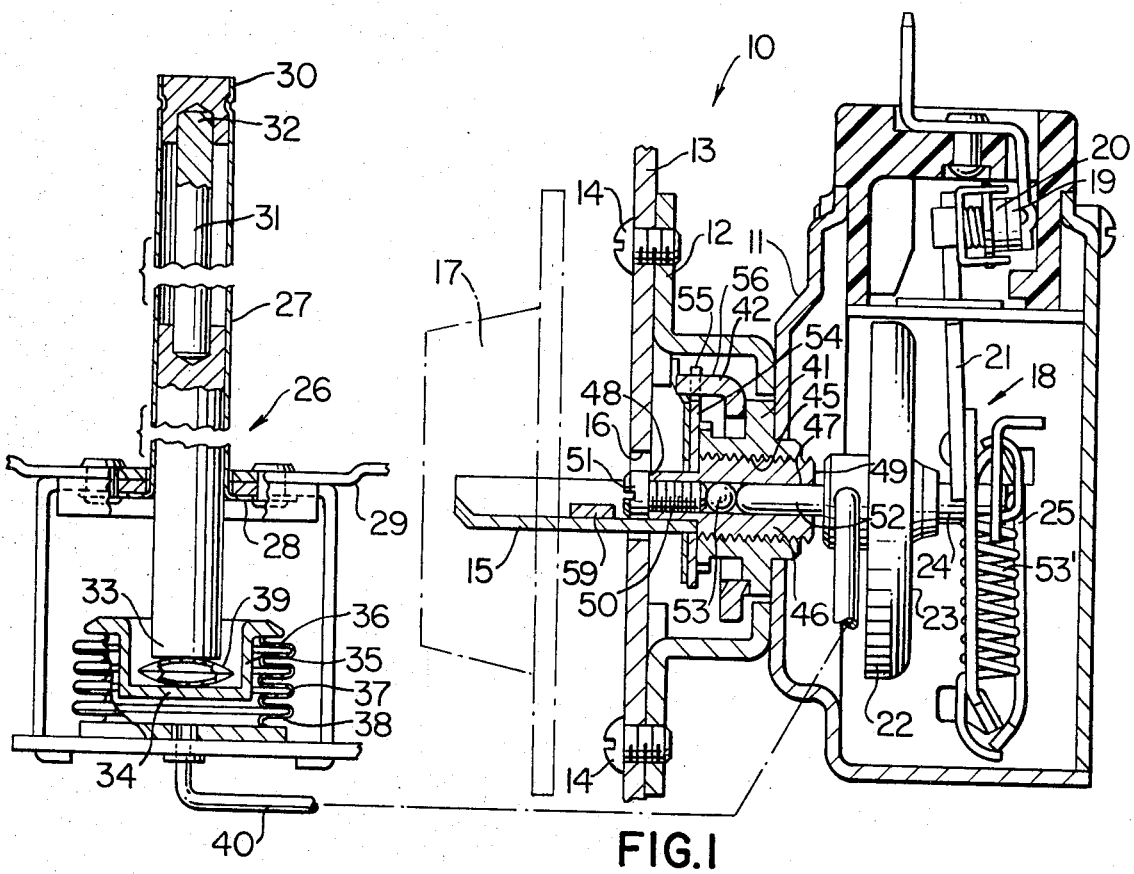
FIG. 1 is a cross-sectional view illustrating the control device of this invention.

While the various features of this invention are hereinafter described and illustrated as being particularly adaptable for providing fail-safe features for the power element of a control device that collapses upon temperature rise, it is to be understood that the various features of this invention may be utilized for calibrating a control device that has its power element expand upon temperature rise.

Therefore, this invention is not to be limited to only the embodiment illustrated in the drawings, because the drawings are merely utilized to illustrate one of the wide variety of uses of this invention.

Referring now to FIG. 1 the improved control device of this invention is generally indicated by the reference numeral 10 and is fully described and illustrated in the aforementioned patent to Hild et al., U.S. Pat. No. 3,409,758, in regard to the majority of the parts, use and operation thereof whereby only sufficient details thereof will be hereinafter described to fully understand the improved calibration features of this invention.

In particular, the control device 10 includes a frame means 11 having a bracket portion 12 adapted to be secured to a control panel 13 of a domestic cooking oven or the like by suitable fastening means 14 so that a control shaft means 15 of the control device 10 can project through an opening 16 in the control panel 13 and receive a control knob 17 on the outer end thereof. The frame means 11 carries an electrical switch 18 that includes fixed contact means 19 and movable contact means 20 carried by lever means 21 and when disposed in the closed position as illustrated in FIG. 1, the electrical switch 18 is adapted to direct electrical current across the heating means of the oven or the like and when disposed in the open position of FIG. 2 will terminate the operation of the heating means in a manner well known in the art.

Figure 2:
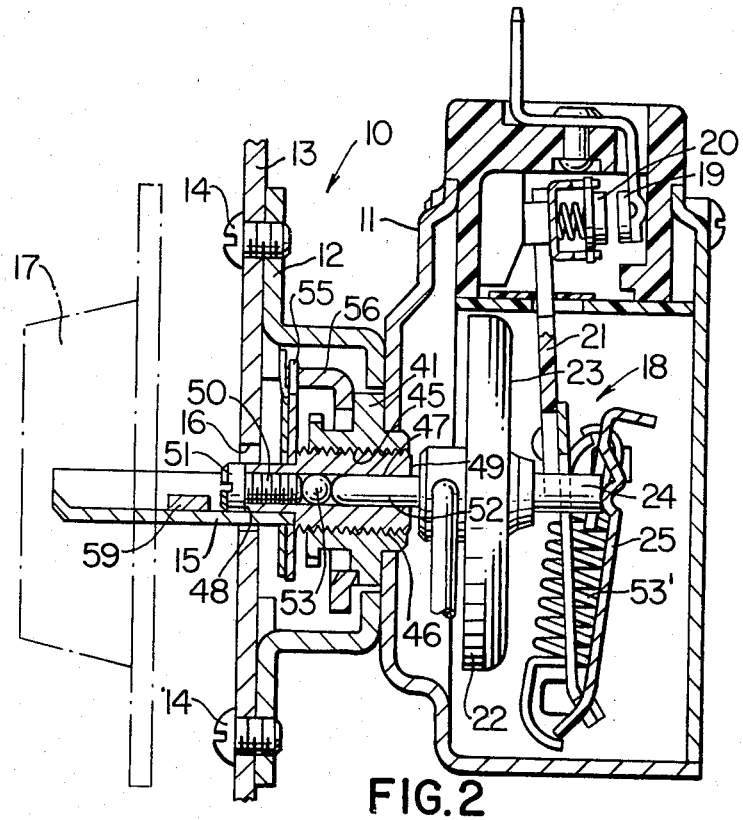
FIG. 2 is a view similar to FIG. 1 and illustrates the control device in another operating position thereof wherein the electrical switch is in an open position.
Figure 3:
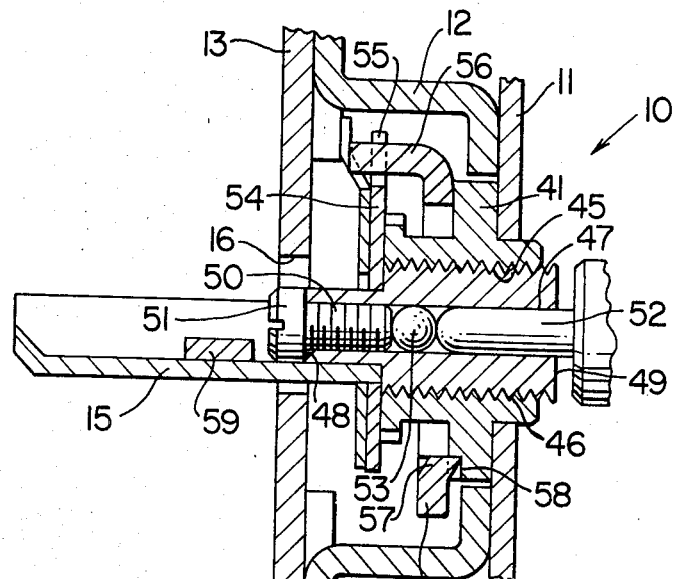
FIG. 3 is an enlarged fragmentary view of the calibration portion of the control device of FIG. 1.

An expansible and contractible power element 22 is disposed in the frame means 11 and has a movable wall 23 provided with a stem 24 for bearing against a lever 25 of the lever means 21 so that when the power element 22 is held in the position illustrated in FIGS. 1 and 2 and the power element 22 is collapsed due to a rise in sensed temperature in a manner hereinafter described, the movable wall 23 moves to the left in FIG. 1 whereby the lever means 21 opens the contact means 19 and 20. Conversely, when the power element 22 expands upon the sensing of a decrease in temperature, the movable wall 23 moves to the right in FIG. 2 a distance that subsequently causes the lever means 21 to close the contacts 19 and 20 in the manner illustrated in FIG. 1.

The sensor for the power element 22 is generally indicated by the reference numeral 26 in FIG. 1 and comprises a tube 27 having one end 28 thereof secured to a stationary frame 29 of the cooking apparatus of the like while the other end 30 thereof projects into the cooking oven or other space being heated by the heating means under the control of the control device 10. A rod 31 is disposed in the tube 27 and has one end 32 thereof secured to the end 30 of the tube 27 so as to move in unison therewith while the other end 33 of the rod 31 projects out of the open end 28 of the tube 27 and operatively bears against the closed end 34 of a cup-shaped member 35 closing one end 36 of a bellows construction 37 having its other end 38 closed by and fixed to the frame means 29 in a suitable manner, opposed bowed ambient temperature compensating washer means 39 being disposed between the end 33 of the rod 31 and the bellows 37. The interior of the bellows 37 is interconnected by a conduit means 40 to the interior of the power element 22.

Since the bellows 37 has a natural tendency to expand, when the temperature in the space being heated increases, the same causes the tube 27 to expand and since the rod 31 is formed of material having a lower coefficient of expansion relative to the coefficient expansion of the tube 27, the end 33 of the rod 31 moves away from the bellows 37 so that the bellows 37 expands and, thus, draws fluid from the power element 22 to collapse the same. Conversely, upon a temperature drop, the tube 27 contracts at a greater rate than the rod 31 whereby the rod 31 collapses the bellows construction 37 to pump fluid therefrom into the power element 22 and thereby cause expansion of the same.

A hub 41 of the control device 10 is normally clamped from rotation relative to the frame means 11 by a retainer plate 42 being held from rotation relative to the frame means 11 by suitably extensions 43 of the frame 11 being received in corresponding recesses 44 formed in retainer plate 42. The hub 41 has a threaded bore 45 passing axially therethrough and receiving a threaded portion 46 of the control shaft means 15 so that rotation of the control shaft 15 will cause the externally threaded portion 46 to axially move in the threaded bore 45.

The externally threaded portion 46 of the control shaft means 15 has an axial bore 47 passing therethrough and defining annular shoulders 48 and 49 at opposed ends thereof. The opening 47 is internally threaded at the left hand end 48 thereof so as to threadedly receive an adjusting set screw 50 having an enlarged head 51 that is adapted to bottom out against the end 48 of the threaded portion 46 for a purpose hereinafter described.

The power element 22 has a stem 52 extending from the left hand side thereof and be received in the right hand end of the opening 47 of the control shaft means 15 and is urged by the spring means 53' of the lever means 21 of the electrical switch means 18 at all times into operative engagement with the set screw 50, a metallic ball 53 also being disposed in the opening 47 of the control shaft means 15 so as to be disposed between the stem 52 of the power element 22 and the set screw 50 to minimize frictional engagement therebetween during rotation of the control shaft means 15.

A stop plate 54 is splined to the control shaft 15 to rotate in unison therewith and has a projection 55 engageable with a tang 56 of the retainer plate 42 so as to limit rotational movement of the control shaft means 15 in opposite directions, the stop plate 54 being urged against the enlarged threaded portion 46 of the control shaft means 15 by a spring washer as illustrated.

As previously stated, the control device 10 is calibrated in such a manner that the operator or the like can turn the control knob 17 to a desired temperature setting thereof and the control device 10 will tend to maintain the output temperature effect of the heating means at the selected temperature as sensed by the temperature sensor 26.

In particular, when the control knob 17 is set at a desired temperature, such as 350° F. and the temperature of the oven should fall below 350°, the bellows 37 will collapse to such an extent that the power element 22 will expand its movable wall 23 to the right in FIG. 1 to move the contact means 20 into electrical contact with the contact means 19 as illustrated in FIG. 1 to provide operation of the heating means. Conversely, should the temperature of the oven increase beyond the set temperature, the bellows 37 will have expanded to cause collapsing of the power element 22 so that the movable wall 23 moves to the left as illustrated in FIG. 2 to open the contact means 19 and 20.

Thus, by rotation of the control knob 17, the threaded portion 46 of the control shaft means 15 is axially moved inwardly and outwardly relative to the frame element so that the power element 22 is positioned in different positions in the frame means 11 to operate the electrical switch 18 in the manner previously described to maintain the selected temperature effect of the heating means.

However, the control device 10 of this invention has been precalibrated in a manner hereinafter described so that should a loss of fluid for the power element 22 occur anywhere in the fluid system 22, 37, and 40, the power element 22 will collapse so that the movable wall 23 will move to the left to open the contact means 19 and 20 and will maintain such contacts 19 and 20 in the open position thereof even through the control knob 17 is turned to its highest temperature setting position wherein the threaded portion 46 of the control shaft 15 is axially moved its maximum amount to the right in FIG. 1 and the set screw 50 is subsequently threaded inwardly into the opening 47 its maximum amount where the same has its enlarged head 51 bottom out against the shoulder 48 as illustrated in FIG. 1.

In this manner, a loss of fluid from the power element 22 creates a situation where the contact means 19 and 20 can never be moved to the closed position by the set screw 50 and/or control shaft means 15 whereby a fail safe control device 10 is provided by this invention.

The method of precalibrating the control device 10 to perform the aforementioned fail safe feature will now be described.

Figure 4:
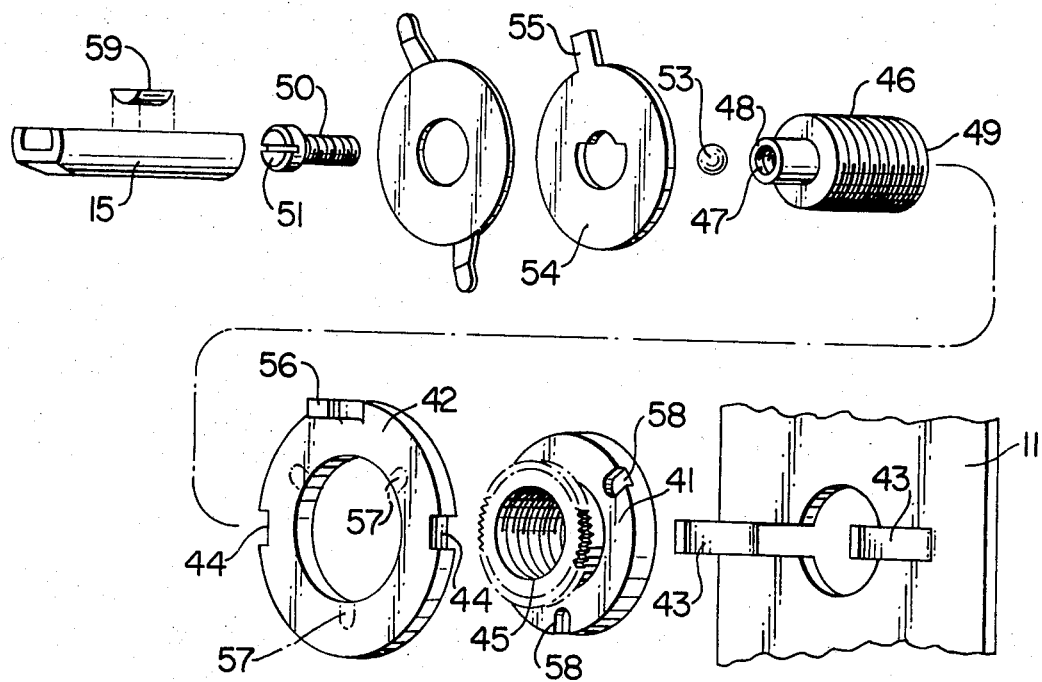
FIG. 4 is an exploded perspective view illustrating the various parts provided in FIG. 3 of the control device of FIG. 1.

After all of the parts of the control device 10 have been assembled together as illustrated in FIG. 1 but before the device 10 is mounted to a frame means 13 and before the hub 41 of the control device 10 is clamped from rotation to the frame means 11 by the retainer plate 42, the set screw 50 is turned so that the same has its enlarged head 51 fully bottomed out against the shoulder 48 of the threaded portion 46 of the control shaft means 15. The control shaft means 15 is turned to its highest temperature setting position which is its 300° arc position from the off position and corresponds to a temperature setting of 605° F. The temperature sensor 26 is then disposed in a bath of liquid being maintained at a temperature of 605° F. whereby the hub 41 is rotated in such a manner relative to the plate 42 which is fixed from rotation by the members 43 of the frame 11 that the hub 41 causes axial movement of the control shaft means 15 to such a position that the electrical switch 18 is just moved to its open condition with the shaft means 15 being held in its 605° F. position and the sensor 26 sensing the 605° F. bath. While the hub 41 can be so manually rotated relative to the plate 42 in any suitable manner for the above purpose, the hub 41 can be rotated by a gear wheel manually disposed in driving relation with a gear portion in the left end thereof as illustrated in FIG. 4 for this calibration purpose. With the hub 41 now in this calibrated rotational position, the retaining plate 42 is utilized to clamp the hub 41 to the frame means 11 so that further rotation of the hub 41 cannot take place. For example, portions 57 of the retaining plate 42 can be staked into recesses 58 formed in the hub 41 so that the hub 41 will be held from rotation relative to the frame 11. Of course, the hub 41 can be fixed from rotation in any other suitable manner if desired.

Thereafter, the temperature sensor 26 is placed in a 400° F. testing bath and the control shaft means 15 is rotated to its 200°. arc position from the off position which is its 400° F. set position. With the control shaft means 15 in its 400° F. position and with the sensor 26 sensing the 400° F. bath, the adjusting screw 50 is backed out of the opening 46 of the threaded portion 46 of the control shaft means 15 away from the shoulder 48 until the electrical switch 18 just moves to its off position. The calibration set screw 50 will now limit the calibration from 400° F. by 50° F. plus or minus 15° F. In particular, should someone thereafter drive the set screw 50 inwardly to bottom out, a 400° F. setting of the shaft means 15 will only produce a temperature of 450° F. plus or minus 15° F.

In this manner, the set screw 50 can never be driven inwardly into the opening 47 of the control shaft means 15 a distance sufficient to cause a fully collapsed power element 22 to hold the switch means 18 in a closed condition which would cause damage to the appliance beyond repair because the screw head 51 will bottom out or abut against the shoulder 48 before the switch means 18 can be closed by the rightward driven collapsed power element 22 whereby the control device 10 has been precalibrated by the features of this invention to a fail safe condition.

During assembly of the control 10, the set screw 50 is bottomed out against the shoulder 48 of the control shaft means 15 in the manner previously described and a calibration screw stop 59 is secured on the control shaft means 15 at a calculated distance from the screw head 51 to provide a distance from the screw head 51 that is calculated for the amount of recalibration wanted in a particular control.

While the stop 59 is not essential for the previously described fail free feature of the control device 10, the stop 59 can apply as a high recalibration limit.

Therefore, it can be seen that not only does this invention provide an improved method of calibrating a control device to be fail safe, but also this invention provides an improved control device that is fail safe.

While the form of the invention now preferred has been disclosed as required by statute, other forms may be used, all coming within the scope of the claims which follow.

What is claimed is:

1. A method for calibrating a control device having an electrical switch and an adjustable expansible and contractable power element having a movable wall for operating said switch comprising the steps of bottoming out a calibration set screw in an opening of an adjustable control shaft means that receives a stem of the power element in the other end of said opening, holding said control shaft means at a high temperature position that corresponds to the temperature of a first bath while disposing the temperature sensor of said power element in said first bath so that said movable wall of said power element will move to a first position thereof, calibrating said device to an off position of said switch while holding said shaft means in said high temperature position and while said power element is in said first position by rotating a hub of said device that threadedly receives said control shaft therein to such a calibrated position, thereafter fixing said hub from rotation in said device in said calibrated position thereof, thereafter moving and then holding said control shaft means at a lower temperature position that corresponds to the temperature of a second bath while disposing said sensor in said second bath so that said power element will be moved to a second position thereof, and thereafter calibrating said device to an off position of said switch while holding said shaft means in said lower temperature position and while said power element is in said second position by backing said set screw out of said opening.

2. A method as set forth in claim 1 and including the step of providing a calibration screw stop on said control shaft means a calculated distance from said set screw when said set screw is a bottomed out position in said opening of said control shaft means to limit outward backing of said set screw from said opening.

3. A method as set forth in claim 1 wherein the temperature of said first bath is approximately 605° F.

4. A method as set forth in claim 3 wherein the temperature of said second bath is approximately 400° F.

5. A method as set forth in claim 1 wherein said switch opens with temperature rise sensed by said sensor of said power element above the temperature setting of said control shaft means, said power element collapsing on temperature rise and expanding on temperature drop.

6. A control device comprising a frame means, an electrical switch carried by said frame means, a hub carried by said frame means and having a threaded bore passing therethrough, a control shaft means threaded in said threaded bore and having an opening passing therethrough, an adjusting set screw disposed in one end of said opening, and having a stop means thereon that is engageable with said control shaft means to limit movement therebetween in one direction, an expansible and contractible power element having a stem disposed in the other end of said opening and being operatively in engagement with said set screw, said power element having a movable wall operatively interconnected to said switch for operating the same, said power element collapsing on sensed temperature rise and opening said switch upon sensed temperature rise above the temperature setting of said control shaft means, said control device having been so calibrated that upon loss of fluid in said power element and a subsequent adjustment of said set screw in a direction tending to cause closing of said switch causes said stop means of said set screw to bottom out against said control shaft means before said power element can be moved in said one direction a distance to cause closing of said switch.

7. A control device as set forth in claim 6 wherein said control shaft means carries a set screw stop disposed spaced from said set screw a calculated distance when said set screw is in a bottomed out position.

* * * * *